United States Patent
Fattal (10) Patent No.: US 9,899,940 B2
(45) Date of Patent: Feb. 20, 2018

(54) POSITION AND SPEED SYNCHRONIZATION FOR A DUAL LINEAR ACTUATOR FLAP SYSTEM

(71) Applicant: EATON CORPORATION, Cleveland, OH (US)

(72) Inventor: Souren Georges Fattal, Palatine, IL (US)

(73) Assignee: Eaton Corporation, Cleveland ( * ) Notice: Subject to any disclaimer, the term of this patent is extended or adjusted under 35 U.S.C. 154(b) by 352 days.

(21) Appl. No.: 14/764,057

(22) PCT Filed: Mar. 14, 2013

(86) PCT No.: PCT/US2013/031720
§ 371 (c)(1),
(2) Date: Jul. 28, 2015

(87) PCT Pub. No.: WO2014/142928
PCT Pub. Date: Sep. 18, 2014

(65) Prior Publication Data
US 2016/0028332 A1    Jan. 28, 2016

(51) Int. Cl.
*H02P 5/68*    (2006.01)
*B64C 9/16*    (2006.01)
(Continued)

(52) U.S. Cl.
CPC .................. *H02P 5/68* (2013.01); *B64C 9/16* (2013.01); *H02P 5/54* (2016.02); *H02P 5/56* (2016.02)

(58) Field of Classification Search
CPC ........................................................ H02P 5/68
(Continued)

(56) References Cited

U.S. PATENT DOCUMENTS 3,803,464 A    4/1974 Kuroyanagi
3,906,313 A    9/1975 Danis et al.
(Continued)

FOREIGN PATENT DOCUMENTS

FR    2119547 A5    8/1972

OTHER PUBLICATIONS

European Patent Office; International Search Report and Written Opinion issued in corresponding International Application No. PCT/US2013/031720. dated Aug. 1, 2014.

*Primary Examiner* — David S Luo
(74) *Attorney, Agent, or Firm* — Fishman Stewart PLLC (57) ABSTRACT

A method for controlling a first motor and a second motor to synchronize respective positions of the first motor and the second motor may comprise comparing the positions to determine a position difference, incrementally increasing a speed of one of the first motor and the second motor and incrementally decreasing a speed of the other of the first motor and the second motor according to the position difference, and repeating the incrementally increasing and incrementally decreasing until the respective positions are synchronized. Additionally, motor current limiting may be applied by reducing the target speed of the motor(s) with high applied torque(s), which may result in a position difference between the two motors subject to synchronization/correction. If current limiting is applied to one or both of the motors, speed synchronization may be applied in addition to position-based synchronization.

20 Claims, 3 Drawing Sheets

(51) Int. Cl.
*H02P 5/54* (2016.01)
*H02P 5/56* (2016.01)

(58) Field of Classification Search
USPC .................................................. 318/85, 34
See application file for complete search history.

(56) References Cited

U.S. PATENT DOCUMENTS 5,216,340 A * 6/1993 Welch ................... B60S 1/0814
  318/41
5,568,026 A    10/1996 Welch

* cited by examiner

# POSITION AND SPEED SYNCHRONIZATION FOR A DUAL LINEAR ACTUATOR FLAP SYSTEM

CROSS-REFERENCE TO RELATED APPLICATION

This application is a national stage filing based upon International Application No. PCT/US2013/031720, with an international filing date of Mar. 14, 2013, the disclosure of which is incorporated herein by reference in its entirety.

BACKGROUND

1. Technical Field

The present disclosure relates generally to aircraft flap systems, including synchronization of flap actuators.

2. Description of the Related Art

In aircraft flap systems, multiple actuators may be involved in controlling the extension and retraction of one or more flap panels. For example, a single flap panel may be actuated by two actuators. The dynamic variations of the load torque applied to each of the two actuators may potentially result in "force fighting" that can affect motor position and adjusted target speed of each actuator, possibly resulting in a difference in the positions of the actuators. Such position differences can cause problems such as undesirable bending in the flap panel, i.e., flap skew.

SUMMARY

To prevent or minimize flap skew, two linear actuators may be synchronized in linear position during flap extension and/or retraction. Furthermore, due to high applied torques on one or both of the actuators, motor current limiting may be desirable in order to limit output torque and prevent the motor current from increasing beyond a threshold beyond which damage to the motor windings and/or the power electronics drive may result. Motor current limiting can be achieved by reducing the target speed of the linear actuator(s) with high applied torque(s), which may result in a position difference between the two linear actuators subject to synchronization/correction. If current limiting is applied to one or both of the motors, speed synchronization may be applied in addition to the position-based synchronization noted above.

In an embodiment, a method for controlling a speed of a first motor to synchronize a first actuator driven by said first motor with a second actuator driven by a second motor may comprise receiving respective positions of the first motor or the first actuator and of the second motor or the second actuator. The method may further comprise comparing the respective positions to each other to determine a position difference and to determine whether the first motor is leading or trailing the second motor. The method may further comprise incrementing the speed if the first motor is trailing and decrementing the speed if the first motor is leading, and repeating the receiving, the comparing respective positions, and the incrementing and decrementing until the position difference is less than a position difference threshold. In the same embodiment, the method may further comprise receiving a motor current of the first motor, receiving a motor current limiting speed adjustment of the second motor, and decrementing the motor speed as long as the motor current is over a certain motor current threshold and if a motor current limiting speed adjustment of the other motor is less than its own motor current limiting speed adjustment if any.

Another embodiment of a method for controlling a first motor and a second motor to synchronize respective positions of the first motor and the second motor may comprise comparing the positions to determine a position difference, incrementally increasing a speed of one of the first motor and the second motor and incrementally decreasing a speed of the other of the first motor and the second motor according to the position difference, and repeating the incrementally increasing and incrementally decreasing until the respective positions are synchronized. In the same embodiment, the method may further comprise receiving motor currents of the first motor and second motors, and decrementing the motor speed of each of the first motor or second motor as long as its motor current is over a certain motor current threshold and apply the largest of the first motor and second motor current limit speed adjustments to the target speed of both the first motor and the second motor.

An embodiment of a system for synchronizing two motors may comprise a first motor, a second motor, a first controller, and a second controller. The first controller may be configured to receive a position of the first motor and a position of the second motor, compare the positions of the first motor and the second motor to determine whether the first motor is a leading motor or a trailing motor, increment a speed of the first motor if it is the trailing motor, decrement the speed of the first motor if it is the leading motor, and repeat the receive, compare, increment, and decrement steps until the difference between the positions of the first motor and the second motor is less than a set or predetermined threshold. The first controller may also be configured to receive the first motor current and the second motor current limiting speed adjustment to decrement the first motor target speed as long as the first motor current is over a certain motor current threshold and apply the current limiting motor speed adjustment of the second motor if it is larger than the first motor current limiting sped adjustment. The second controller may be configured to receive the position of the first motor and the position of the second motor, compare the positions of the first motor and the second motor to determine whether the second motor is the leading motor or the trailing motor, increment a speed of the second motor if it is the trailing motor, decrement the speed of the second motor if it is the leading motor, and repeat the receive, compare, increment, and decrement steps until the difference between the positions of the first motor and the second motor is less than the set or predetermined threshold. The second controller may also be configured to receive the second motor current and the first motor current limiting speed adjustment to decrement the second motor target speed as long as the second motor current is over certain motor current threshold and apply the current limiting motor speed adjustment of the first motor if it is larger than the second motor current limiting speed adjustment.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
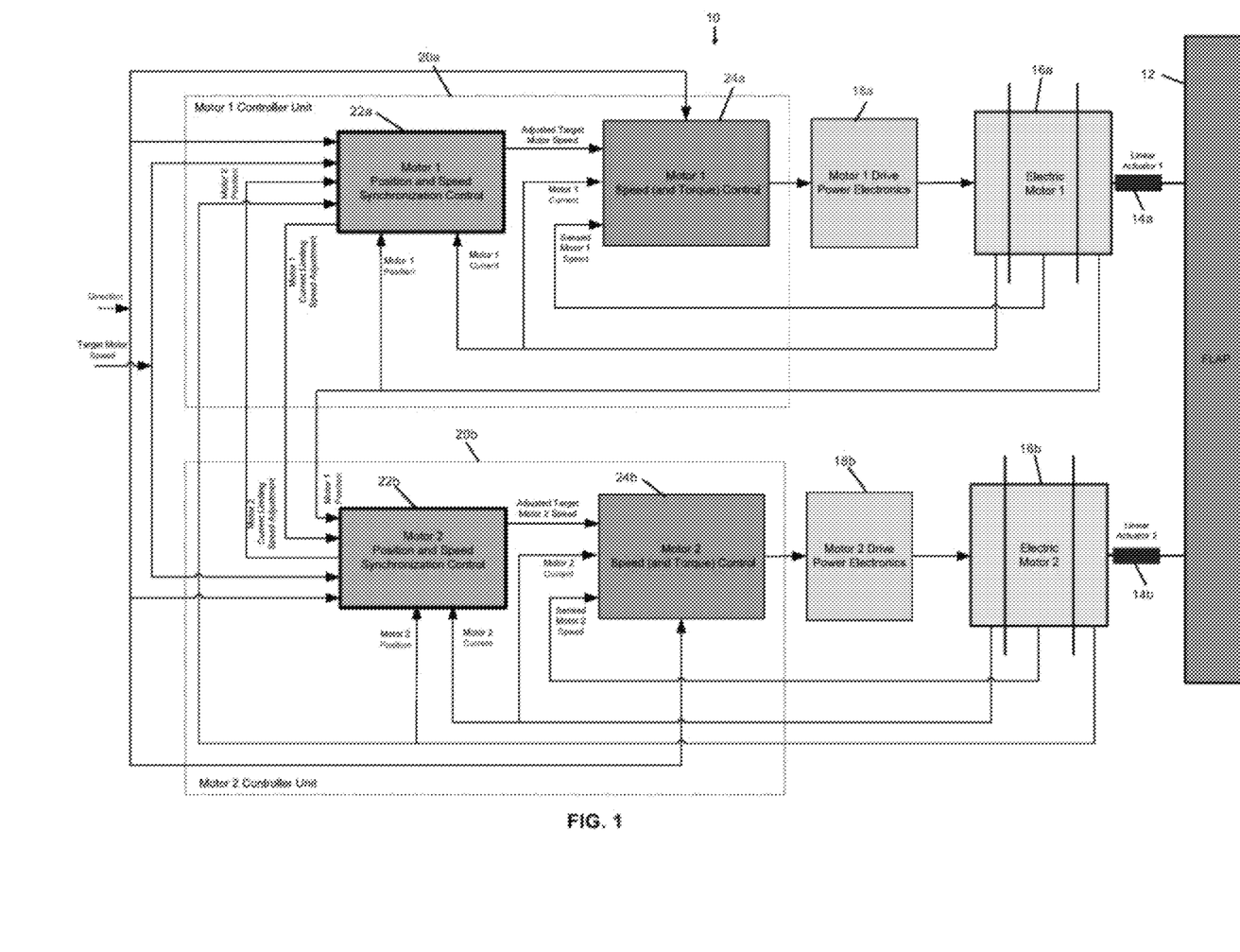
FIG. 1 is a block diagram view of an embodiment of a flap actuator system.

FIG. 1 is a block diagram view of an exemplary flap actuation system 10 including a flap 12 coupled to a first actuator 14a and a second actuator 14b. The first actuator 14a may be driven by a first electric motor 16a, and the second actuator 14b may be driven by a second electric motor 16b. Each electric motor 16a, 16b may be coupled with respective motor drive power electronics 18a, 18b, and each motor drive power electronics 18a, 18b may be coupled with a respective motor control unit (MCU) 20a, 20b. Each MCU 20a, 20b may comprise a motor position and speed synchronization control circuit 22a, 22b (which may simply be referred to herein as a synchronization circuit 22a, 22b) and a motor speed and torque control circuit 24a, 24b.

In an embodiment, a flight control system or a manual user input, such as a lever or switch (not shown), may be used to provide flap actuation commands to the MCUs 20. The flap actuation commands may include a single direction and commanded target speed sent simultaneously to both electric motors 16 so as to smoothly move the flap 12—i.e., such that, ideally, the portions of the flap 12 coupled to the two actuators 14a, 14b are synchronized in position throughout extension or retraction of the flap 12. The target speed and direction may be received by the MCUs 20 and translated into control signals for the motor drive power electronics 18 to operate the motors 16. The linear actuators 14 may translate motion of the motors 16 (i.e., rotation) into linear movement of the flap 12.

As noted above, external forces on the flap 12 may cause the motors 16 to deviate from the target speed provided by the flight control system or manual input. Furthermore, external forces may cause the motors 16 to deviate from the target speed by amounts different from each other, leading to non-synchronized positions of the motors 16a, 16b and of the actuators 14a, 14b. Thus, each motor position and speed synchronization control circuit 22 may be configured to execute an algorithm to synchronize the positions of the motors 16 and/or actuators 14. Each motor position and speed synchronization control circuit 22 may receive the target motor speed and direction, the position of the "on-side" electric motor 16 (i.e., the motor 16 to which the respective MCU 20 is coupled, where electric motor 16a is on-side with respect to MCU 20a, and electric motor 16b is on-side with respect to MCU 20b), and the position of the "cross-side" motor (i.e., the motor 16 to which the respective MCU 20 is not coupled, where electric motor 16b is cross-side with respect to MCU 20a and electric motor 16a is cross-side with respect to MCU 20b). Each motor position and speed synchronization control circuit 22 may output an adjusted target motor speed for its on-side motor 16 so as to synchronize its position with the position of the cross-side motor 16. The synchronization algorithm performed by the motor position and speed synchronization control circuit 22 may include a multi-level incremental speed adjustment, as explained below.

External forces on the flap 12 may also cause the electrical current of one or both of the motors 16a, 16b to reach undesirable levels. Thus, each motor position and speed control circuit 22a, 22b may be configured to execute a current limiting algorithm, to maintain the motor current of its on-side motor 16a, 16b below a certain motor current threshold by decrementing the motor target speed so it can keep the motor current within an acceptable range below the certain motor current threshold. This motor position and speed synchronization control circuit 22 may include a current increase avoidance algorithm by preventing to the on-side motor 16 to increase its speed if motor position synchronization is needed and if the on-side motor current is over certain motor current threshold, thus letting the cross-side motor 16 only decrement its speed to synchronize to the on-side motor 16 position. Each motor position and speed synchronization control circuit 22 may receive, in addition to the data noted above, the current of its on-side motor 16 and the current limiting speed adjustment executed by the cross-side motor position and speed synchronization control circuit 22. Each motor position and speed synchronization control circuit 22 may further adjust the adjusted target motor speed of its on-side motor 16 to synchronize with the cross-side motor if the cross-side motor current limiting speed adjustment is larger than the on-side motor current limiting speed adjustment if any.

The algorithms described herein (i.e., motor position synchronization and current limiting) are not limited to a particular type of motor, application, or implementation. Accordingly, although the algorithms are illustrated and described with reference to a flap system, the algorithms are not limited to such use. Furthermore, the algorithms are not limited to implementation in particular hardware or to implementation in a particular level of a control hierarchy. For example, in an embodiment, the algorithms may be performed separately for each motor 16 by separate MCUs 20 respectively coupled to the motors 16, as shown in FIG. 1. In other embodiments, the motor position and speed synchronization controls 22a, 22b for two motors 16a, 16b may be consolidated into a single device or apparatus. Such an apparatus may include other known MCU functionality (e.g., motor speed and torque control 24), or may be separate from one or more MCUs 20 used to control the motors 16. Still further implementations are possible and contemplated and may not deviate from the spirit and scope of the appended claims.

Although multiple mentions are made above and below to a "circuit," such as the motor position and speed synchronization circuits 22a, 22b, it should be understood that such nomenclature is for ease of reference only. A "circuit" may be implemented in any form known in the art, including hardware, software, FPGA, etc. Furthermore, "circuits" referenced herein may be implemented in one or more devices or apparatus in combination with each other and/or with other devices and functionality. Thus, "circuits" referenced herein are also not limited to a particular implementation.

The algorithms described herein are also not limited to a particular type of position or current sensing. Position sensing may be performed on the motor 16, actuator 14, or otherwise, using known sensors, in an embodiment. Furthermore, the rotational position of the motor 16 and the linear position of the actuator 14 may be related by a fixed factor, so the "motor position" referenced herein may be obtained by motor rotational position sensing or actuator linear position sensing, in an embodiment. The algorithms will be described below with reference to sensing the position of each motor 16a, 16b in terms of electrical revolutions, but the algorithm is not so limited. Similarly, current sensing may be performed on the motor 16 using known current sensors, in an embodiment, and the algorithms are not limited to those current sensors shown and described in this disclosure.

Figure 2:
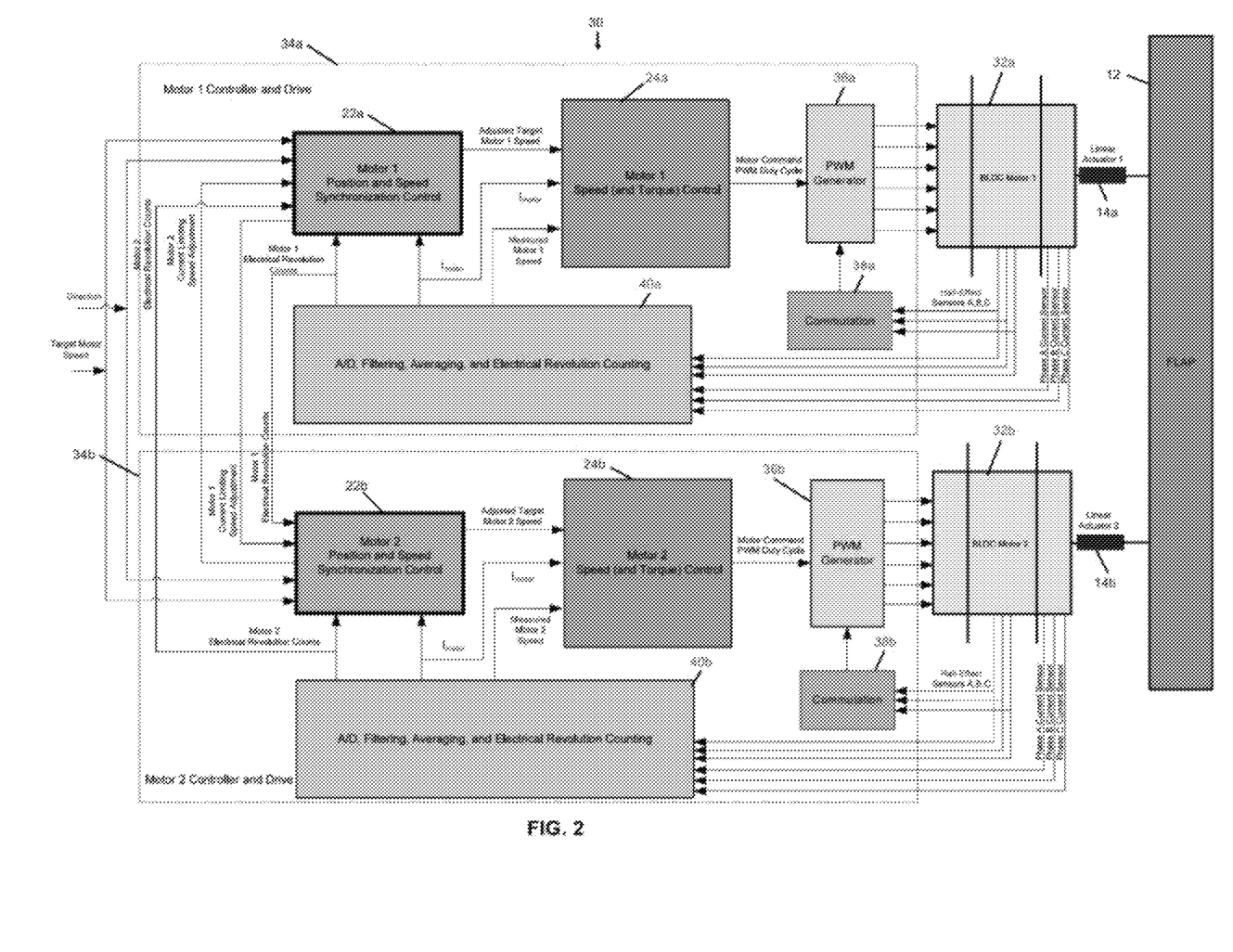
FIG. 2 is a block diagram view of an exemplary implementation of the system of FIG. 1.

FIG. 2 is a schematic view of an exemplary implementation of the system of FIG. 1, shown as a flap actuation system 30. The flap actuation system 30 may include a flap 12 coupled to a first linear actuator 14a and a second linear actuator 14b. The first actuator 14a may be driven by a first brushless DC (BLDC) motor 32a, and the second actuator 14b may be driven by a second BLDC motor 32b. Each BLDC motor 32a, 32b may be coupled with a respective motor controller and drive 34a, 34b. Each motor controller and drive 34a, 34b may include a motor position and speed synchronization control module 22a, 22b, a motor speed and torque control module 24a, 24b, a pulse-width modulation generator 36a, 36b, a commutation circuit 38a, 38b, and a filtering, Analog to Digital (A/D) conversion, and counting circuit 40a, 40b.

Each of the BLDC motors 32a, 32b may include or be coupled to one or more position sensors (illustrated as Hall-Effect Sensors A, B, C) that provide output to a respective commutation circuit 38a, 38b and a filtering, A/D conversion, and counting circuit 40. In an embodiment, Hall-effect sensors may be used to measure electrical rotations of the BLDC motors 32. Based on the electrical rotation sensing of the BLDC motor 32, the motor position and speed (e.g., in RPM) of the BLDC motors 32 may be determined as well as the motor position and speed of the actuators 14.

Each of the BLDC motors 32 may also include or be coupled to one or more current sensors (shown as Phase A Current Sensor, Phase B Current Sensor, and Phase C Current Sensor) that provide output to a respective filtering, A/D conversion, and counting circuit 40. The current sensors may comprise, in an embodiment, various sensors known in the art.

Each filtering, A/D conversion, and counting circuit 40 (which for brevity may be referred to simply as the "counting circuit" 40) may be configured to receive input from position and current sensors; convert that input from analog to digital format, if necessary; and filter that input, if necessary (i.e., using one or more filters including those known in the art). The counting circuit 40 may be further configured to convert input from the position sensors into an integer representing a position of the motor 32. For example, the integer may represent a number of full electrical revolutions of the motor 32. Thus, in an embodiment, the counting circuit 40 may be configured to count electrical revolutions of the BLDC motor 32. In another embodiment, the counting circuit 40 may be configured to count fractions of electrical or mechanical revolutions of the BLDC motor 32, where for example, one mechanical revolution may be equal to two electrical revolutions for a 4-pole BLDC motor. One electrical or mechanical revolution of a BLDC motor 32 may correspond to a known linear displacement of the actuator 14 to which it is coupled. This linear displacement depends on the design of the mechanical components, such as gears of the linear actuators. Each counting circuit 40a, 40b may be further configured to provide an integer value representative of the on-side motor position (e.g., in electrical revolutions) and the on-side motor current to both the on-side and cross-side synchronization circuits 22a, 22b. The integer value may be representative of total movement of the on-side motor BLDC 32 (e.g., wherein an initial rigged position (that may be the non-extended position of the actuator, the extended position of the actuator, or any other set position of the actuator) of the motor 32 is arbitrarily assigned a value of zero (0) or other value), or of movement of the BLDC motor 32 within a given time frame (in which case the synchronization circuits 22 may maintain a total position calculation). The synchronization circuits 22a, 22b may use that information to synchronize the positions of the BLDC motors 32a, 32b as will be described in greater detail below.

Each commutation circuit 38a, 38b may be configured to receive an output of position sensors, sample the output, and provide the sampled output to a PWM generator 36a, 36b to control the timing and operation of a BLDC motor 32a, 32b, as known in the art. Each PWM generator 36a, 36b may also receive input from the motor speed control circuit 24 and provide an input signal to the BLDC motor 32a, 32b to control its operation (i.e., speed and direction). The output of the motor speed and torque control circuit 24a, 24b may be a duty cycle for the PWM generator 36a, 36b based on the output of the synchronization circuit 22a, 22b.

Each synchronization circuit 22 may be configured to receive a movement command (e.g., including a motor speed and direction), such as from a digital flight control system, a flap control lever, or other input mechanism including those known in the art. Each synchronization circuit 22 may also be configured to receive the positions of both BLDC motors 32a, 32b (each represented as a signed integer, in an embodiment), the current of the on-side BLDC motor 32, and speed adjustment and current limiting information regarding the cross-side BLDC motor 32. The synchronization circuit 22 can use this input to incrementally increase and decrease the speed of the on-side motor to synchronize the positions of the motors 32a, 32b according to a control algorithm, such as the control algorithm described below in conjunction with FIG. 3. In an embodiment, the synchronization circuits 22a, 22b may execute independent control loops—i.e., although each position synchronization circuit 22 may receive input from both an on-side and cross-side motor 32a, 32b, a single position synchronization circuit 22a, 22b may control only its on-side motor 32.

Figure 3:
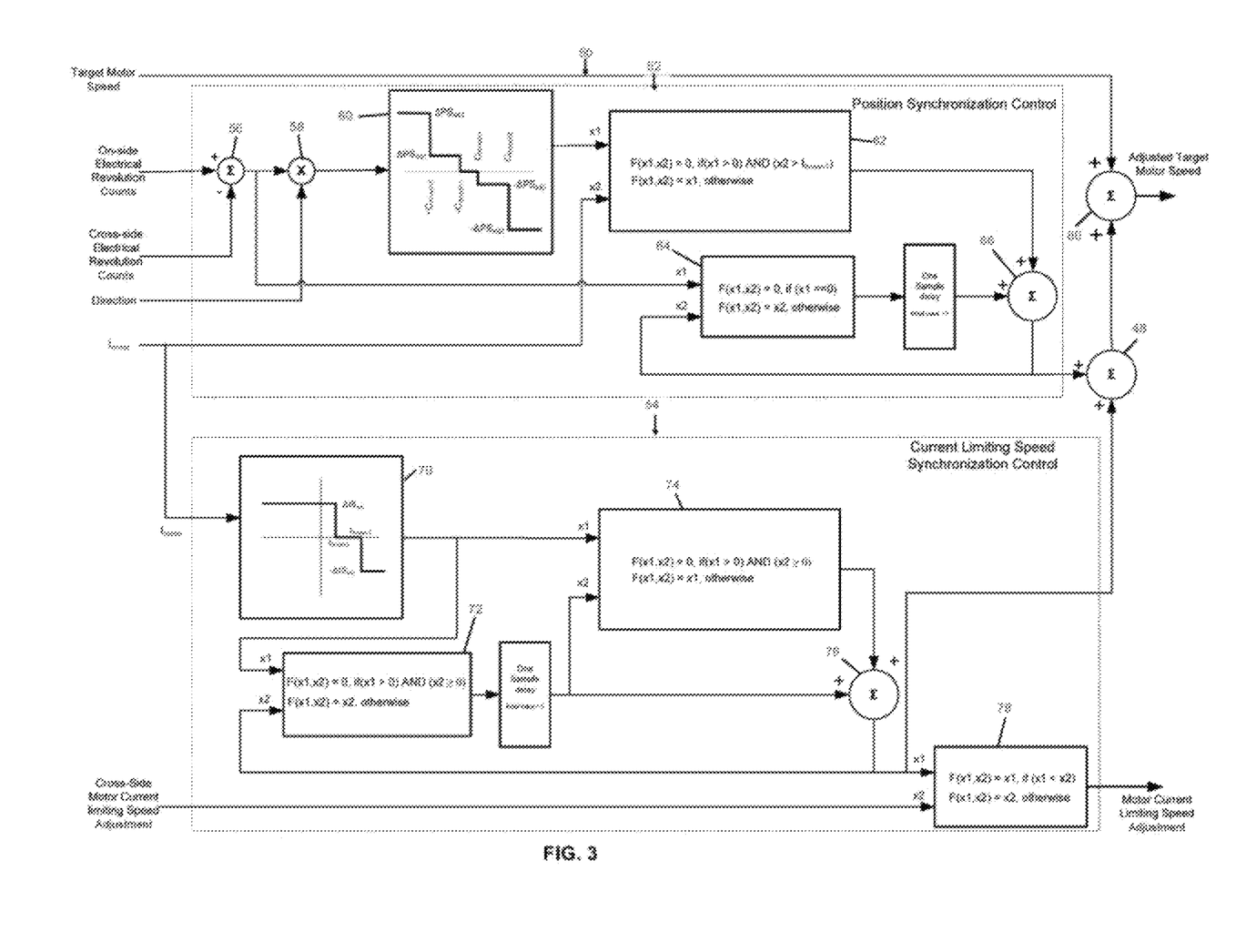
FIG. 3 illustrates an algorithm for controlling the speed of a motor driving a flap actuator.

FIG. 3 is a block diagram view of an exemplary control algorithm 50 that may be applied by a synchronization circuit (e.g., one or both of the synchronization circuits 22a, 22b) to adjust the speed of an on-side motor. The control algorithm 50 may include a position synchronization algorithm 52 and a current limiting and speed synchronization algorithm 54. In general, the position synchronization algorithm 52 may be applied or executed to adjust the speed of the motor in order to make the positions of the actuators equal or nearly equal. The current limiting and speed synchronization algorithm 54 may be applied or executed to adjust the output of the position synchronization algorithm 52 to maintain the motor current within a desired range for optimal functionality of the motor.

The control loop for the position synchronization algorithm 52 may be conceptualized as a multi-level, small adjustment, incremental control algorithm that adjusts the on-side motor speed to bring and keep the difference between the two motor positions to zero or near zero. Execution of the position synchronization algorithm 52 for both motors may thus result in numerous incremental increases in the speed of the trailing-in-position motor and numerous incremental decreases in the speed of the leading-in-position motor.

The position synchronization algorithm 52 may receive, as input, the positions of the on-side motor and the cross-side motor, the desired direction of flap movement, and the on-side motor current. At a first comparison block 56, respective positions of the on-side motor and the cross-side motor may be compared to determine which actuator is more extended and which actuator is less extended. The positions, in an embodiment, may be integers representative of a number of electrical revolutions of the motors, as noted above. Also as noted above, in an embodiment, the position of each motor may be set at zero (0) for an initial, rigged position (which may be the non-extended position of a flap, for example) such that any position of a motor may be either zero (in the non-extended actuator state) or positive (in an extended actuator state). This initial value may be arbitrary, and may be any value. Furthermore, in an embodiment with an appropriate position sensor, the position of a motor may be a decimal or other value.

At a multiplication block 58, the desired direction of actuation (i.e., extension or retraction) is applied to the position difference to determine if the on-side motor and actuator are leading (i.e., farther in the desired direction of movement than the cross-side motor and actuator) or trailing (i.e., less far in the desired direction of movement compared to the cross-side motor and actuator). The direction signal by which the position difference is multiplied may be set to (+1) for forward displacement (i.e., deployment, or extension) and (−1) for backward displacement (i.e., retraction), in an embodiment. For example, if the direction is (+1), a positive difference between the on-side and cross-side electrical revolution counts may indicate that the on-side motor and actuator are leading and may need to decrease speed, while the cross-side motor and actuator may be trailing and may need to increase speed to synchronize the positions of the motors. In an embodiment, synchronization may be considered achieved when the position difference is less than a predetermined position difference threshold. In an embodiment, the threshold may be one (1)—i.e., synchronization is considered to be achieved when the motors have identical positions in terms of a number of electrical revolutions. Of course, the position difference threshold may be larger, in an embodiment. Furthermore, in an embodiment with an appropriate position sensor, the position difference threshold may be a decimal or other value. If the direction of movement is (−1), a positive difference between the on-side and cross-side electrical revolution counts may indicate that the on-side actuator is trailing and may need to increase its speed while the cross-side actuator may need to decrease its speed until synchronization is achieved.

At a speed adjustment block 60, an initial adjustment may be made to the speed of the on-side motor (e.g., in RPM). The initial adjustment may be incremental—i.e., a fixed increase or decrease of the current motor speed. In an embodiment, the initial adjustment may be selected from among five amounts, or levels: a large negative level (shown as $-\Delta PS_{adj2}$), a small negative level (shown as $-\Delta PS_{adj1}$), a neutral level (i.e., zero adjustment), a small positive level (shown as $\Delta PS_{adj1}$), and a large positive level (shown as $\Delta PS_{adj2}$).

The initial speed adjustment may be determined according to the relative positions of the motors and the desired movement direction. If the on-side actuator is the leading actuator, and is leading by more than a first threshold (shown as $C_{thresh1}$, in the illustrated embodiment) but less than a second threshold (shown as $C_{thresh2}$), the speed of the on-side actuator may be decremented by a relatively small amount (i.e., the speed may be adjusted by $-\Delta PS_{adj1}$). If the on-side actuator is the leading actuator, and is leading by more than the second threshold $C_{thresh2}$, the speed of the on-side actuator may be decremented by a relatively large amount (i.e., the speed may be adjusted by $-\Delta PS_{adj2}$). In an embodiment, the relatively small amount $-\Delta PS_{adj1}$ may be about a negative quarter (−0.25) of an RPM, and the relatively large amount $-\Delta PS_{adj2}$ may be about negative one (−1) RPM.

If the on-side actuator is the trailing actuator, and is trailing by more than a first threshold (shown as $-C_{thresh1}$) but less than a second threshold (shown as $-C_{thresh2}$), the speed of the on-side actuator may be incremented by a relatively small amount (i.e., $\Delta PS_{adj1}$). If the on-side actuator is the trailing actuator, and is trailing by more than the second threshold, the speed of the on-side actuator may be incremented by a relatively large amount (i.e., $\Delta PS_{adj2}$). In an embodiment, the relatively small amount $\Delta PS_{adj1}$ may be about a quarter (0.25) of an RPM, and the relatively large amount $\Delta PS_{adj2}$ may be about one (1) RPM.

It should be understood that the specific numbers and values of increments and thresholds described above are exemplary only, and not limiting. Thus, although the initial speed adjustment is described above with reference to a five-level scheme, more or fewer levels may be used, in an embodiment. Furthermore, although the negative and positive levels are described as equal, this need not be the case, in an embodiment. Similarly, although four thresholds are described with equal positive and negative thresholds, the present disclosure is not limited to the specific thresholds noted above, the specific number of thresholds noted above, or equal positive and negative thresholds.

The output of the speed adjustment block 60 may be input to a current limiting block 62 (which is different from the current limiting algorithm described below). The current limiting block 62 may also receive a value representing the current of the on-side motor, $I_{motor}$, as input. If the current of the on-side motor is greater than a first current threshold, $I_{thresh1}$, and the speed adjustment block instructs an increase (i.e., incrementing) of the speed of the on-side motor, the current limiting block 62 may output an incremental speed adjustment of zero (0). This is to safeguard against the motor current exceeding $I_{thresh1}$, which may damage the motor. Otherwise (i.e., if the motor current does not exceed $I_{thresh1}$ or if the speed adjustment block 62 instructs a decrement in the speed or no change in the speed), the first current limiting block may output the incremental speed adjustment provided by the speed adjustment block 62.

A previous speed adjustment block 64 may receive the position difference between the motors, as well as the previous speed adjustment output by the position synchronization algorithm 52. If the positions of the motors are equal, the previous speed adjustment block 64 may output a zero (0). If not, the previous speed adjustment block 64 may output the previous adjustment output by the position synchronization algorithm 52. At a second comparison block 66, the previous adjustment (output by the previous adjustment block 64) and current adjustment (output by the current limiting block 62) may be combined to calculate a synchronization-based differential change in the target motor speed.

The above description of the position synchronization algorithm 52 may alternately be conceptualized by the following pseudo-code:

```
If (diff_count ≥ C_thresh2)
    adj = -ΔPS_adj2
else if (C_thresh2 > diff_count ≥ C_thresh1)
    adj = -ΔPS_adj1
else if (diff_count ≤ -C_thresh2)
    adj = ΔPS_adj2
else if (-C_thresh2 < diff_count ≤ -C_thresh1)
    adj = ΔPS_adj1
```

```
else if (diff_count == 0)
    adj = 0
    prev_adj = 0
If (I_motor > I_thresh1) AND (adj > 0)
    adj=0
total_adj = prev_adj + adj
prev_adj = total_adj
``` where diff_count is the difference between the positions of the actuators, $C_{thresh2}$ and $C_{thresh1}$ are the position difference thresholds, $-\Delta PS_{adj2}$, $-\Delta PS_{adj1}$, $\Delta PS_{adj1}$, and $\Delta PS_{adj2}$ are the speed increment levels, adj is the incremental speed adjustment by the present iteration of the position synchronization algorithm 52, prev_adj is the accumulated speed adjustment output by the previous iteration of the position synchronization algorithm 52, and total_adj is the accumulated speed adjustment output by the present iteration of the position synchronization algorithm 52 (i.e., the speed adjustment that should be added to the commanded target speed).

The accumulated speed adjustment calculated according to the position synchronization algorithm 52 may, for example, be combined with a speed adjustment from the current limiting speed synchronization algorithm 54 at a third combination block 68. The speed adjustment from the current limiting speed synchronization algorithm 54 may be calculated as described below, in an embodiment.

The current limiting speed synchronization algorithm 54 may, for example, be conceptualized as a multi-level small adjustment incremental control with a dead-zone that may limit the current of the on-side motor by decreasing its target motor speed and then may communicate the resulting adjustment of the target motor speed (which may be negative or zero (0)) to the cross-side position synchronization circuit so the same or a similar adjustment may be applied to the target motor speed of the cross-side motor. The result may be that once one of the motors decreases its speed to limit its motor current, the other motor may apply the same adjustment in order to be synchronized to the adjusted speed of the other motor. An embodiment of such an algorithm is described in greater detail below.

The current limiting algorithm 54 may receive, as input, the on-side motor current and the output of the cross-side current limiting speed synchronization algorithm (i.e., the current-limiting algorithm 54 applied by the cross-side synchronization circuit). A goal of the current limiting algorithm may be to maintain the current of the on-side motor between a lower threshold, $I_{thresh2}$, and an upper threshold, $I_{thresh3}$ if the motor current exceeds the upper threshold, $I_{thresh3}$.

The current limiting algorithm 54 may include an initial adjustment block 70 that receives the current of the on-side motor and compares that current to $I_{thresh2}$ and $I_{thresh3}$. If the current level is below $I_{thresh2}$, the initial adjustment block may output a positive incremental adjustment (shown as $\Delta IS_{adj}$). If the current level is between $I_{thresh2}$ and $I_{thresh3}$, the initial adjustment block 70 may output an incremental adjustment of zero (0) (i.e., the "dead zone" referred to above). If the current level is above $I_{thresh3}$, the initial adjustment block 70 may output an incremental adjustment of $-\Delta S_{adj}$. In an embodiment, the magnitude of the positive incremental adjustment and the negative incremental adjustment may be equal, as illustrated. In another embodiment, the magnitude of the positive incremental adjustment and the negative incremental adjustment may be unequal. The thresholds $I_{thresh2}$ and $I_{thresh3}$ may be selected or determined according to characteristics of the motors and/or the actuators and of the system in which the motors/actuators are placed.

The current limiting algorithm 54 may further include a previous adjustment block 72, which may receive, as input, the output of the initial adjustment block 70 as well as the output of the previous iteration of the current limiting algorithm 54. If the output of the initial adjustment block 70 is positive, and the output of the previous current limiting algorithm 54 iteration is non-negative, the previous adjustment block 72 may output an adjustment of zero (0). Otherwise, the previous adjustment block 72 may output the output of the previous iteration of the current limiting algorithm 54.

The current limiting algorithm may also include a sign-check block 74 that receives the output of the previous adjustment block 72 and the initial adjustment block 70. If the initial adjustment block 70 output is positive and the previous adjustment block 72 output is non-negative, the sign-check block outputs a zero (0). Otherwise, the sign check block 74 outputs the output of the initial adjustment block 70. The sign-check block 74 ensures that the total speed adjustment due to current limiting will only be negative or zero (0).

At a combination block 76, the output of the sign check block 74 and the previous adjustment block 72 may be combined to calculate an on-side motor current limit speed adjustment. The on-side motor current limit speed adjustment may be input to a cross-side adjustment comparison block 78, which may also receive as input the motor current limit adjustment from the cross-side synchronization circuit (i.e., the output of the adjustment comparison block 78 for the cross-side synchronization circuit). The on-side adjustment comparison block 78 may output the lower of the two (i.e., on-side and cross-side) current limiting speed adjustments. As noted above, this may be to ensure that the two actuators slow down equally (i.e., synchronized their adjusted target speed) due to current limiting applied to one or the two motors.

The motor current limit adjustment algorithm described above (for the on-side actuator) may also be conceptualized according to the following pseudo-code:

```
if (I_motor ≥ I_thresh3)
    adj= = -ΔIS_adj
else if (I_motor ≤ I_thresh2)
    adj = ΔIS_adj
else if (I_thresh2 < I_motor < I_thresh3)
    adj = 0
if (total_adj ≥ 0) And (adj > 0)
    adj = 0
total_adj = prev_adj + adj
prev_adj = total_adj
``` where $I_{motor}$ is the on-side motor current, adj is the incremental adjustment from the present iteration of the algorithm, prev_adj is the total accumulated adjustment from the previous iteration of the algorithm, and total_adj is the total accumulated adjustment from the present iteration of the algorithm. It should be noted that the above pseudo-code does not account for the cross-side current limiting adjustment, as the algorithm described above otherwise does.

In an embodiment, the incremental current limit speed adjustment may be added to the incremental target motor speed adjustment from the position synchronization algorithm 52 at a combination block 68, as noted above, to arrive at a total incremental speed adjustment. The total incremental speed adjustment may be combined with the commanded target motor speed received from the flight control computer or other apparatus at a comparison block 80 to calculate a total adjusted target motor speed. Referring to FIGS. 1, 2, and 3, the total target motor speed may be input to motor speed control circuit 24 and used to control the on-side motor 16, 32, as described above.

The position synchronization algorithm 52 and the current limiting algorithm 54 may each be executed many times per second, in an embodiment. For example, both the position synchronization algorithm 32 and the current limiting algorithm 54 may be executed, for example only, at about 1 kHz—i.e., about one thousand times per second—or more. Of course, different rates may be used, in an embodiment, and the position synchronization algorithm 52 and the current limiting algorithm 54 may be executed at rates different from each other, in an embodiment.

The various functions of the position synchronization algorithm 52 and the current limiting algorithm 54 may all be performed in a single processor, apparatus, or circuit, or may be divided into two or more separate processors, circuits, or apparatus. For example, in an embodiment, some or all position synchronization computations and functionality may be included in a position synchronization circuit, and some or all current limiting computations and functionality may be included in a current limiting speed synchronization circuit. In an embodiment, the position synchronization circuit and the current limiting speed synchronization circuit may comprise the same processor, circuit, or apparatus.

The speed adjustments $\Delta PS_{adj}$ and $\Delta IS_{adj}$ for position and current limiting speed synchronization control may be determined from modeling and simulation and may be tuned to an actual system. The smaller $\Delta PS_{adj}$ and $\Delta IS_{adj}$ are, the longer the algorithm may take to synchronize the two motor/actuators, but the more stable and less oscillatory the response may be. The larger $\Delta PS_{adj}$ and $\Delta IS_{adj}$ are, the faster the algorithm may synchronize the two actuators, but the less stable and more oscillatory the response may be. Hence, the selections of the values of the speed adjustments $\Delta PS_{adj}$ and $\Delta IS_{adj}$ and how many levels of adjustments are needed may be design specific parameters that may be selected based on the desired performance requirements of the control algorithm 50.

It should be understood that the methods described above, including the position and speed synchronization control algorithm, are not limited to a specific type of linear actuator. The methods described above are also not specific to any particular sensing techniques utilized to obtain the motor linear or rotational position and the motor linear or rotational speed.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed:

1. A method for controlling a speed of a first motor to synchronize a first actuator driven by said first motor with a second actuator driven by a second motor, comprising:
   receiving respective positions of said first motor or said first actuator and of said second motor or said second actuator;
   comparing the respective positions to each other to determine a position difference and whether said first motor is leading or trailing said second motor;
   incrementing said speed if said first motor is trailing and decrementing said speed if said first motor is leading; and
   repeating the receiving, the comparing respective positions, and the incrementing and decrementing until the position difference is less than a position difference threshold.

2. The method of claim 1, wherein said position difference threshold is a first position difference threshold, wherein the incrementing comprises incrementing said speed by a first amount if said first motor is trailing and the position difference is equal to or greater than the first position difference threshold and less than a second position difference threshold and incrementing said speed by a second amount if said first motor is trailing and the position difference is greater than or equal to the second position difference threshold.

3. The method of claim 2, wherein the first amount is less than the second amount.

4. The method of claim 2, wherein the first amount is about one quarter of a revolution per minute and the second amount is about one revolution per minute.

5. The method of claim 1, further comprising:
   receiving a motor current from said first motor; and
   comparing the motor current to a motor current threshold;
   wherein the incrementing and decrementing comprises incrementing said speed if said motor is trailing and if the motor current is less than the motor current threshold and decrementing said speed if said first motor is leading.

6. The method of claim 1, further comprising:
   receiving a motor current of said first motor;
   incrementing a motor current speed adjustment said motor current is below a first motor current threshold and said motor current speed adjustment is less than zero and decrementing said motor current speed adjustment if said motor current is above a second motor current threshold; and
   incrementing said speed by said current limiting speed adjustment.

7. The method of claim 1, further comprising:
   receiving a motor current of said first motor;
   receiving a motor current speed adjustment of said second motor;
   incrementing a motor current speed adjustment of said first motor if said motor current is below a first motor current threshold and if the motor current speed adjustment of said first motor is less than the motor current speed adjustment of said second motor, and decrementing said motor current speed adjustment of said first motor if said motor current is above a second motor current threshold; and
   incrementing said speed by said motor current speed adjustment of said first motor.

8. The method of claim 1, wherein the receiving, the comparing respective positions, and the incrementing and decrementing are repeated about one thousand times per second or more.

9. A system comprising:
a first motor;
a second motor;
a first controller configured to:
- receive a position of the first motor and a position of the second motor;
- compare the positions of the first motor and the second motor to determine whether the first motor is a leading motor or a trailing motor;
- increment a speed of the first motor if it is the trailing motor;
- decrement the speed of the first motor if it is the leading motor; and
- repeat the receive, compare, increment, and decrement steps until the difference between the positions of the first motor and the second motor is less than a set or predetermined threshold; and a second controller configured to:
- receive the position of the first motor and the position of the second motor;
- compare the positions of the first motor and the second motor to determine whether the second motor is the leading motor or the trailing motor;
- increment a speed of the second motor if it is the trailing motor;
- decrement the speed of the second motor if it is the leading motor; and
- repeat the receive, compare, increment, and decrement steps until the difference between the positions of the first motor and the second motor is less than the set or predetermined threshold.

10. The system of claim 9, wherein each controller is configured to perform the receive, compare, increment, and decrement steps about one thousand times per second or faster.

11. The system of claim 9, wherein the set or predetermined threshold is a first threshold; and
wherein the first controller is further configured to:
- increment the speed of the first motor by a first amount if the first motor is the trailing motor and if the difference between the positions is greater than a second threshold and less than a third threshold;
- increment the speed of the first motor by a second amount if the second motor if the trailing motor and if the difference between the positions is greater than the third threshold;
- decrement the speed of the first motor by a third amount if the first motor is the leading motor and if the difference between the positions is greater than the second threshold and less than the third threshold; and
- decrement the actuation speed of the first motor by a fourth amount if the first motor is the leading motor and if the difference between the positions is greater than the third threshold; and wherein the second controller is further configured to:
- increment the speed of the second motor by the first amount if the second motor is the trailing motor and if the difference between the positions is greater than the second threshold and less than the third threshold;
- increment the speed of the second motor by the second amount if the second motor if the trailing motor and if the difference between the positions is greater than the third threshold;
- decrement the speed of the second motor by the third amount if the second motor is the leading motor and if the difference between the positions is greater than the second threshold and less than the third threshold; and
- decrement the actuation speed of the second motor by the fourth amount if the second motor is the leading motor and if the difference between the positions is greater than the third threshold.

12. The system of claim 11, wherein the first amount is less than the second amount and the third amount is less than the fourth amount.

13. The system of claim 11, wherein the first amount is substantially equal to the third amount and the second amount is substantially equal to the fourth amount.

14. The system of claim 9, wherein the positions of the first motor and the second motor are represented as signed integers.

15. The system of claim 14, wherein the signed integers are calculated according to a number of electrical revolutions of the first and second motors.

16. The system of claim 9, further comprising an aircraft flap panel, wherein the first motor and the second motor are coupled with the flap panel and are configured to extend and retract the flap panel.

17. The system of claim 9, wherein the first controller is further configured to:
- receive a first current input to the first motor and a second current input to the second motor;
- compare the first current and the second current to a set or predetermined current threshold; and
- decrement the speed of the first motor if the first current or the second current is above the current threshold; and wherein the second controller is further configured to:
- receive the first current input to the first motor and the second current input to the second motor;
- compare the first current and the second current to a set or predetermined current threshold; and
- decrement the speed of the second motor if the first current or the second current is above the current threshold.

18. A method for controlling a first motor and a second motor to synchronize respective positions of said first motor and said second motor, the method comprising:
- comparing said positions to determine a position difference;
- incrementally increasing a speed of one of said first motor and said second motor and incrementally decreasing a speed of the other of said first motor and said second motor according to the position difference; and
- repeating the incrementally increasing and incrementally decreasing until said respective positions are synchronized.

19. The method of claim 18, wherein the incrementally increasing and decreasing includes multiple levels of speed increase and multiple levels of speed decrease, wherein a level of speed increase and a level of speed decrease are selected according to the position difference.

20. The method of claim 18, further comprising:
- receiving a first motor current of said first motor and a second motor current of said second motor;
- comparing the first motor current and the second motor current to one or more current thresholds to determine a first current limit speed adjustment for said first motor and a second current limit speed adjustment for said second motor; and decrementing the speed of the first motor and the speed of the second motor by the lesser of the first current limit speed adjustment and the second current limit speed adjustment.

\* \* \* \* \*